Aug. 11, 1936.  L. A. UMANSKY  2,051,018

SPEED RATIO INDICATING DEVICE

Filed March 28, 1934

Inventor:
Leonid A. Umansky,
by Harry E. Dunham
His Attorney.

Patented Aug. 11, 1936

2,051,018

UNITED STATES PATENT OFFICE 2,051,018

SPEED RATIO INDICATING DEVICE

Leonid A. Umansky, Schenectady, N. Y., assignor to General Electric Company, a corporation of New York Application March 28, 1934, Serial No. 717,831

11 Claims. (Cl. 80—56)

This invention relates to means for measuring speed ratios of a plurality of objects, such as a plurality of rotating shafts, and it has for an object the provision of a simple, reliable and improved device of this character.

Devices of this general nature have been previously known and used, but the devices heretofore used have been inaccurate or unsatisfactory when applied to objects having rather wide speed ranges. Accordingly, a further object of this invention is the provision of means for greatly extending the speed range for devices of this kind within which accurate ratio indication may be obtained.

In one of its aspects, this invention relates to strip rolling mills and the like, and particularly to devices for continuously indicating the percent "draft" taken, i. e., the reduction of the strip being effected throughout each pass. The invention has particular application to cold strip mills in which, due to the spring of the rolls and mill housings, the position of the screw-down does not furnish an accurate indication of the true gage of the rolled strip, or the percent draft taken during any given pass.

The invention is carried into effect in one form thereof by providing means for producing voltages proportional to the speeds of a plurality of objects, and an electrical indicating instrument is provided for indicating the ratio of these voltages, together with means for compensating the error of the instrument due to varying voltages.

In illustrating the invention, in one form thereof, it is shown as applied to a reversible cold strip steel rolling mill to provide an indication of the percent draft taken by the mill rolls during any given pass.

Figure 1:
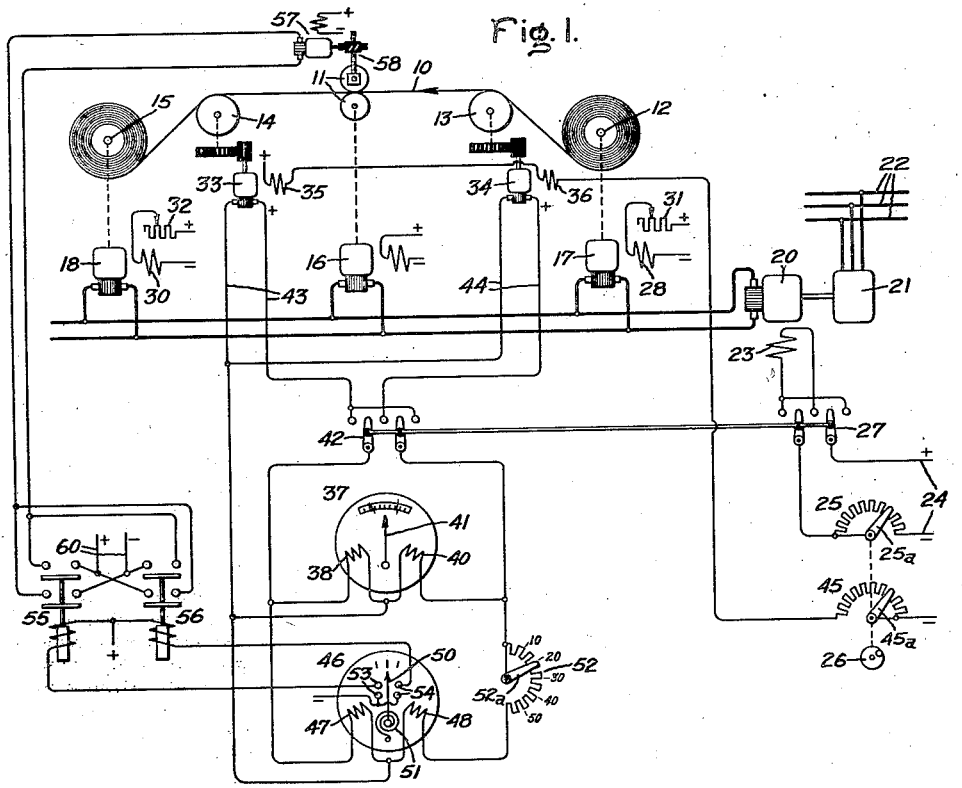
Figure 2:
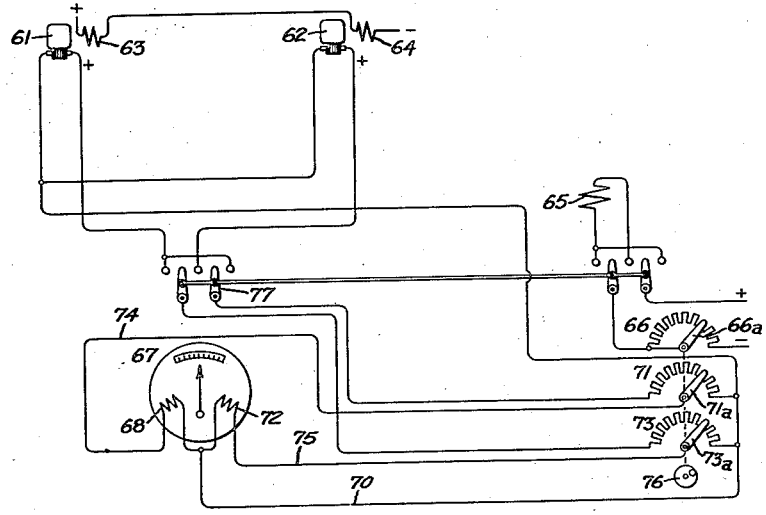

For a better and more complete understanding of the invention, reference should now be had to the following specification and to the accompanying drawing in which Fig. 1 is a simple diagrammatical representation of an embodiment of the invention, and Fig. 2 is a modification of the arrangement of Fig. 1.

Referring now to the drawing, a strip of material 10, such for example as a strip of cold steel, is passed between a pair of mill rolls by means of which its thickness is reduced. As indicated by the arrow, the strip 10 is paid out of a trailing reel 12, and passes over a cooling drum 13 to the mill rolls 11. After having its thickness reduced the strip is delivered from the mill rolls over a cooling drum 14 and is wound upon the leading reel 15.

The mill rolls 11 are driven by any suitable driving means, illustrated as a direct current motor 16, whilst the reels 12 and 15 are illustrated as also being driven by means of direct current motors 17 and 18 respectively. These motors 16, 17 and 18 are supplied from a generator 20, which is driven at a speed which is preferably constant, by means of an alternating current motor 21 which is supplied from a suitable alternating current source represented in the drawing by the three supply lines 22. As shown, the supply generator 20 is provided with a field winding 23 separately excited from a suitable direct source represented by the plus and minus supply lines 24. A variable resistance 25 is included in the circuit of the generator field winding 23 for the purpose of varying the voltage of the generator and the speeds of the motors 16, 17 and 18 in a well-understood manner. Although the resistance 25 may be varied by any suitable means it is illustrated as provided with a hand-wheel 26 for actuating movable contact arm 25$_a$.

The mill illustrated is of the single stand reversible type, and for the purpose of reversing the direction of rotation of the mill motor 16 and reel motors 17 and 18 a suitable reversing switch 27 is included in the field circuit of the generator 20 for reversing the polarity of the voltage supplied to the driving motors. The motors 17 and 18 are shown as respectively provided with field windings 28 and 30 in the circuits of which variable resistances 31 and 32 are respectively included. The details of the reel motor control do not constitute any part of the present invention and are omitted to avoid unnecessary complication.

It is obvious that, owing to the reduction in the thickness of the strip 10 effected by the mill rolls 11, the linear speed of the strip at the entering side of the mill is always less than the linear speed of the strip at the delivery side. The ratio of these two speeds is the measure of the percent draft taken. For the purpose of measuring the entering and delivery strip speeds, thereby to measure the percent draft taken, a pair of tachometer generators 33 and 34 are respectively connected to the shafts of cooling drums 14 and 13 through suitable reduction gearing. These tachometer generators 33 and 34 are illustrated as direct current machines respectively provided with direct current field windings 35 and 36 which are illustrated as being connected in series relationship with each other to a separate direct current source represented by plus and minus signs. This source may be and, preferably, is the same as that represented by the supply line 24. If desired, the generators 33 and 34 may be alternating current machines instead of direct current machines. Since the generators 33 and 34 are separately excited, their voltages are proportional to the speeds of the drums 14 and 13 and therefore proportional to the linear speeds of the strip, assuming that drums 13 and 14 are of the same diameter.

If the mill is not equipped with cooling drums, as shown, or their equivalent, friction rollers driven by the strip may be provided to drive the tachometer generators. In order to indicate the ratio of the entering and delivery speeds of the strip and, therefore, the percent draft taken by the rolls, means 37 are provided for indicating the ratio of the voltages generated by the tachometer generators 33 and 34. The device 37 is illustrated as an electrical ratio indicating instrument provided with a pair of coils 38 and 40 set at a predetermined angle with each other and a movable element 41 having no biasing spring. Connections are provided for connecting the armatures of the tachometer generators 33, 34 with the corresponding coils 38 and 40 of the indicating instrument. A reversing switch 42 mechanically connected to the mill reversing switch 27 is included in these connections for interchanging the connections between the generators 33 and 34 and the respective coils 38 and 40 of the indicating device when the direction of travel of the strip 10 is changed. With the switch 42 operated to its left-hand position, the coil 38 is connected by means of conductors 43 to tachometer generator 33 and similarly coil 40 is connected by means of conductors 44 to tachometer generator 34. When the switch 42 is operated to its right-hand position tachometer generator 33 is connected to coil 40 and tachometer generator 34 is connected to coil 38.

If the coil 38 only is energized, the needle 41 is deflected to the extreme left of the scale, whereas if only coil 40 is energized the needle is deflected to the extreme right of the scale. When both coils are energized the needle will occupy a position corresponding to the resultant magnetization of the two coils. In other words, the position of the needle 41 is an indication of the ratio of the voltages of the tachometer generators 33 and 34 which in turn are measures of the shaft speeds of the drums 14 and 13 respectively. Since the ratio of the shaft speeds of the drums 14 and 13 is a measure of the percent draft taken by the rolls 11, it is clear that the position of the needle 41 is an indication of the percent draft taken by the rolls as well as a measure of the speed ratio of the shafts of the cooling drums.

By observing the indicator 37, the operator is enabled to adjust the screw-down so as to maintain the draft at any desired value provided the indication of the device is sufficiently accurate. Furthermore, the device should maintain its accuracy throughout a very wide range of linear speeds of the strip. For example, if the mill speed is reduced to 25 percent of its maximum value, the entering and delivery speeds of the strip will be proportionally reduced, but their ratio remains the same. The draft indicator should, therefore, indicate the same value as when operating at the higher speed.

However, instruments similar to the indicating device 37 do not indicate accurately over a wide range of voltages and because of this, means 45 is provided for compensating the instrument 37 for errors in the indication due to wide changes in voltage. The compensating means 45 is illustrated as a variable resistance connected in the common field circuit of the tachometer generators 33 and 34. The movable contact arm 45a of this variable resistance is connected to the shaft of the hand-wheel 26 so that when the latter is rotated to vary the speed of the mill, the resistance of the field circuit of tachometer generators 33 and 34 is proportionately altered. The initial connection of the resistance 45 and its initial setting are so made that when the hand-wheel 26 is rotated to vary the speed of the mill, the resistance 45 is altered so as to maintain the voltages of the tachometer generators 33 and 34 which are supplied to the coils 38 and 40 substantially constant for all mill speeds. In this manner, the device 37 will operate with substantially the same degree of accuracy over the entire speed range of the mill. The dial of the meter 37 will, therefore, be calibrated either in ratio of speeds of the shafts of cooling drums 14 and 13 or, if preferred, in percent draft taken by the rolls 11.

A second instrument 46 may also be provided which enables the operator to determine more accurately whether the actual draft taken equals the draft that it is desired to take. This instrument 46 is a differential voltmeter provided with two coils 47 and 48 energized from the same tachometer generators 33 and 34 respectively as those from which the coils 38 and 40 are respectively energized. The movable element 50 of the voltmeter 46 is provided with a biasing spring 51 which biases the movable element to a central position. The deflections of the movable element from the central position are thus proportional to the difference of the voltages applied to the coils 47 and 48 and thus the scale could if desired be calibrated to read the difference between the delivery and entering speeds of the strip, expressed in feet per minute.

Since the actuating coils 47 and 48 are energized from the same tachometer generators as those from which the coils 38, 40 of instrument 37 are energized, the meter 46 will retain its accuracy at all operating speeds of the mill for the reasons previously mentioned with respect to the instrument 37.

The instrument 46 is readily utilized as a "zero setting" meter, i. e., to indicate merely whether the draft taken by the rolls is correct or incorrect. For this purpose, a "draft" rheostat 52 is included in the circuit of actuating coil 48. A scale is provided in cooperative relationship with the movable contact arm 52a of the rheostat. This scale is calibrated in percent draft so that when the draft actually taken by the rolls equals that indicated on the scale 52, the amount of resistance in the circuit of the coil 48 is such that the currents in both coils 47 and 48 are balanced and the movable meter element 50 occupies this central zero position. In other words, the zero deflection of the needle 50 is an indication that the desired percent draft is being taken by the mill rolls.

This voltmeter 46 may be provided with contacts for controlling the setting of the screw-down itself and thus for automatically controlling the draft. For this purpose, the meter 46 is provided with contacts 53 and 54 which are arranged respectively in the energizing circuits of reversing contactors 55 and 56 which in turn control the energization of the screw-down motor 57 for operating the screw-down 58 in either the up or down direction.

The operation will readily be understood from the following description:—

Assume the reversing switches 27 and 42 to be operated to their left-hand positions with the strip 10 being passed through the mill in the direction of the arrow. The position of the contact arm 25a indicates that the voltage of the generator 20 is high and that the mill is, therefore, operating at high speed. Under these conditions, the voltages generated by the tachometer generators 33 and 34 are supplied to the operating coils 38 and 40 of the indicating instrument 37 and as previously pointed out, the deflection of the needle 41 is an indication of the ratio of the shaft speeds of the drums 14 and 13 and, therefore, a measure of the percent draft taken by the rolls 11.

If the speed of the mill is changed, e. g. decreased by operating the hand-wheel 26 in a counter-clockwise direction, the deflection of the needle 41 should remain the same as before. As the mill speed is decreased the voltages of the tachometer generators 33 and 34 tend to decrease in proportion and, thus, if this decrease in voltage were not compensated, the deflection of the needle 41 is apt to vary from its previous position for the reasons previously described. However, as the voltages of the tachometer generator 33. 34 tend to decrease due to the decrease in mill speed, the movable contact arm 45a which is operated in a counter-clockwise direction simultaneously with the movement of contact arm 25a, decreases the resistance of the field circuit of the tachometer generators 33 and 34. As a result, the excitation of these tachometer geenrators is increased by an amount proportional to the decrease in their speeds and thus the tendency for their voltages to decrease with the decrease in speed is offset by the increase in their excitation. Thus, the voltages supplied to the coils 38 and 40 remain substantially constant and the deflection of the needle 41 remains as before.

Assume that a draft of 10% is being taken. This means that the voltage of the tachometer generator 33 is 10% greater than the voltage of the tachometer generator 34. Consequently, the magnetization of the coil 47 will be stronger than the magnetization of the coil 48 and the needle 50 will be deflected to the left. By moving the rheostat arm 52a in a clockwise direction, the balance can be reestablished and the position of the arm 52a can be marked 10% on the calibrated scale. In this manner, the entire scale 52 can be calibrated and thus when it is desired to take a certain draft, the operator sets the rheostat arm 52a at the percent draft desired to be taken and then manipulates the screw-down until the needle 50 is in its central or zero position.

If automatic control of the screw-down is provided as illustrated in Fig. 1 any departure from the desired draft will deflect the needle 50 in one direction or the other. For example, suppose that the draft increases beyond the desired amount, the needle 50 is operated in a counter-clockwise direction to bridge the contacts 53 and thus establish an energizing circuit for the operating coil of the contactor 55 which is readily traced from the positive side of a source through the operating coil of contactor 55 and the contacts 53 to the negative side of the source. Contactor 55 in responding to energization closes its contacts to connect the armature of the screw-down motor 57 to the source 60 in such a manner that the screw-down 58 is operated in a direction to decrease the draft.

Similarly, if the draft decreases below the desired amount, the needle 50 is operated in a clockwise direction to bridge the contacts 54, and close the contactor 56 and thus cause the screw-down motor 57 to operate in a direction to increase the draft.

It will thus be seen that the contact-making voltmeter 46 automatically maintains the draft at any desired value.

When the pass is completed, it is necessary to reverse the direction of operation of the mill and this is accomplished by operating the reversing switch 27 to its right-hand position. Since the reversing switch 42 is mechanically connected to the reversing switch 27, the switch 42 is likewise operated to its right-hand position, thus connecting the tachometer generator 33 to the coils 40 and 48 and similarly connecting the tachometer generator 34 to the coils 38 and 47. If the polarity of the voltages of the generators 33 and 34 remained the same as before, this interchange of connections would cause a reverse deflection of the needles 41 and 50. However, the reversal of the direction of operation of the mill also effects reversal of the voltages of generators 33 and 34 and, consequently, the deflections of needles 41 and 50 remain the same as before.

In the modification illustrated in Fig. 2, some of the elements of Fig. 1, a repetition of which is unnecessary to an understanding of the system of Fig. 2, have been omitted for the purpose of simplifying the drawing. In this modification, the tachometer generators 61 and 62 are similar to the tachometer generators of Fig. 1 and are similarly driven from cooling drums or equivalent means. The field windings 63 and 64 of these tachometer generators do not have a compensating rheostat included in their circuits as in the system of Fig. 1, but on the contrary are directly connected to a source of direct current represented by plus and minus supply lines. The field winding 65 is similar to the field winding 23 of the supply generator 20 in the system of Fig. 1, and thus it will be understood throughout the following description that the field winding 65 is the field winding of a generator from which the mill motor and reel motors are supplied and that the rheostat 66 is included in circuit with the field winding 65 for the purpose of varying the speeds of these motors.

The indicating instrument 67 is in all respects identical with the indicating instrument 37 of Fig. 1. The right-hand terminal of the actuating coil 68 is connected by means of conductor 70 to the right-hand terminal of a rheostat 71, whereas the left-hand terminal of actuating coil 72 is connected by the same conductor 70 to the right-hand terminal of a rheostat 73. As shown, the left-hand terminal of coil 68 is connected by means of conductor 74 to the movable contact arm 71a of rheostat 71, whilst the right-hand terminal of coil 72 is connected by means of conductor 75 to the movable contact arm 73a of rheostat 73. It will be observed that the movable contact arms 66a, 71a and 73a of the three rheostats are connected together. However, the connections to these resistances are chosen so that a clockwise rotation of the handwheel 76 effects a decrease of the resistance 66 and an increase of the resistances 71 and 73. Conversely, a counter-clockwise rotation of the handwheel 76 effects an increase of the resistance 66 and a decrease of resistances 71 and 73.

When the reversing switch 77 is operated to its left-hand position, the tachometer generator 61 will be connected to the terminals of the resistance 73 and similarly the tachometer generator 62 will be connected to the terminals of the resistance 71.

Since the resistance 66 is increased when resistances 71 and 73 are decreased and vice versa, it will readily be understood that when the mill speed is changed by means of the rheostat 66 the position of the arms 71a and 73a will be altered so as to maintain substantially the same voltages applied to the coils 68 and 72, thereby compensating for any error of the instrument 67 that might be introduced as a result of a change in the voltages applied to the actuating coils. In this manner, the meter 67 will operate with substantially the same degree of accuracy over the entire speed range of the mill, and as in the case of the system of Fig. 1, the meter may thus be calibrated in ratio of speeds of the shafts of the cooling drums or in percent draft taken by the rolls.

It is quite obvious that the rheostats 71 and 73 should be closely matched against each other since the accuracy of the meter 67 will depend upon the degree with which these rheostats are matched. Except for the inclusion of the resistances 71 and 73 in the circuits of the operating coils of the indicating instruments, the modified system of Fig. 2 is in all other respects identical with the system of Fig. 1 and the operation is identical with that previously described in connection with Fig. 1.

Although the invention is described as embodied in concrete form and operating in a specific manner, it will be understood that the apparatus and connections shown and described are merely illustrative and that the invention is not limited thereto since alterations and modifications will readily suggest themselves to persons skilled in the art without departing from the true spirit of the invention or the scope of the annexed claims.

What I claim as new and desire to secure by Letters Patent of the United States, is:—

1. Means for measuring the speed ratio of a plurality of objects comprising means for producing voltages proportional to the speeds of said objects, an electrical instrument connected to said voltage producing means for indicating the ratio of said voltages, and means for compensating the indication of said instrument for changes in the speeds of said objects.

2. A device for indicating the speed ratio of a plurality of objects comprising means for producing voltages proportional to the speeds of said objects, an electrical instrument for indicating a ratio relationship of said voltages, and compensating means for maintaining said voltages substantially constant with changing speeds of said objects.

3. A system for indicating the ratio of the speeds of a plurality of rotating objects comprising means for generating voltages proportional to the speeds of said objects, an electrical instrument connected to said generating means for indicating a ratio relationship of said voltages, means for simultaneously varying the speeds of said objects, and mean for compensating the error of said instrument with changing voltage comprising means for maintaining the voltage input to said instrument substantially constant with changing speeds of said objects.

4. A system for indicating the speed ratio of a plurality of rotating objects comprising in combination means for producing voltages proportional to the speeds of said objects, an electrical instrument connected to said voltage producing means for indicating a ratio relationship of said voltages, means for simultaneously varying the speeds of said objects, and means for compensating the error of said instrument due to changing voltage comprising means connected to be simultaneously actuated with said speed changing means for maintaining the voltage input to said instrument substantially constant with widely varying speeds of said objects.

5. A speed ratio indicating system comprising a plurality of rotating shafts, a plurality of generators, one connected to each of said shafts for generating a voltage proportional to the speed thereof, an electrical instrument connected to said generators for indicating a ratio relationship of said voltages, means for varying the speeds of said shafts while maintaining their speed ratio, and means for compensating the error of said instrument due to widely varying voltages comprising means for controlling the output of said generators to maintain substantially constant input to said instrument with changing speeds of said shafts.

6. A speed ratio indicating system comprising a plurality of rotating shafts, a plurality of generators, one connected to each of said shafts for generating a voltage proportional to the speed thereof, an electrical voltage ratio indicating instrument having a plurality of actuating coils each connected to one of said generators, means for varying the speeds of said shafts while maintaining the ratio thereof, and means for compensating the error of said instrument due to varying voltages comprising means for controlling the excitation of said generators to maintain the voltage input to said coils substantially constant with changing speeds of said shafts.

7. In combination, a rolling mill, a draft indicator therefor comprising means for producing voltages proportional to the entering and delivery speeds of the strip, an electrical voltage ratio indicating instrument connected to said voltage producing means, and means for compensating said instrument for errors due to changes in said speeds.

8. In combination with a rolling mill and means for driving the mill, a draft indicator comprising a generator for generating a voltage proportional to the entering speed of the strip, a second generator operatively connected with the mill for generating a voltage proportional to the delivery speed of the strip, an electrical voltage ratio indicating instrument having a pair of coils, connections between each of said generators and a corresponding one of said coils, means for reversing the direction of said driving means, and means for reversing the connections between said generators and said coils.

9. In combination with a rolling mill and means for driving the mill, a draft indicator comprising a generator for generating a voltage proportional to the entering speed of the strip, a second generator for generating a voltage proportional to the delivery speed of the strip, an electrical voltage ratio indicating instrument having a pair of coils, connections between each of said generators and a corresponding one of said coils, means for adjusting the speed of the mill and a rheostat connected in the field circuit of said generators and connected to said speed adjusting means for compensating the error of said instrument with changing voltage.

10. A speed ratio indicating system comprising a plurality of rotating objects, a plurality of generators operatively connected thereto for generating voltages proportional to the speeds of said objects, an electrical voltage ratio indicating instrument connected to said generators, means for adjusting the speeds of said objects while maintaining the speed ratio, and a rheostat connected in the armature circuit of said generators for compensating the error of said instrument due to changing voltage.

11. A speed ratio indicating system comprising a pair of rotating shafts, a pair of generators operatively connected thereto for generating voltages proportional to the speeds of said shafts, an electrical voltage ratio instrument provided with a pair of coils, connections from each of said generators to a corresponding coil, means for adjusting the speed of said shafts while retaining the speed ratio, and a pair of rheostats, one connected in the armature circuit of each of said generators and both connected to said speed adjusting means for compensating for the error of said instrument due to changing voltages.

LEONID A. UMANSKY.